United States Patent [19]
Griffith et al.

[11] 3,899,038
[45] Aug. 12, 1975

[54] GAUGE WIDTH ADJUSTMENT MEANS FOR TRACK-TYPE VEHICLES

[75] Inventors: Bobby D. Griffith; August H. Bertram, both of Aurora, Ill.

[73] Assignee: Caterpillar Tractor Co., Peoria, Ill.

[22] Filed: May 31, 1974

[21] Appl. No.: 474,976

[52] U.S. Cl. .............................. 180/9.48; 280/34 R
[51] Int. Cl. ............................................. B62d 55/00
[58] Field of Search ........ 180/9.48, DIG. 2; 305/16, 305/17, 18; 280/34 R, 34 A

[56] References Cited
UNITED STATES PATENTS

| | | | |
|---|---|---|---|
| 2,681,231 | 6/1954 | Kondracki | 180/9.48 |
| 2,763,330 | 9/1956 | Potter | 180/9.48 |
| 2,911,229 | 11/1959 | Strehlow | 280/34 R |
| 3,037,571 | 6/1962 | Zelle | 180/9.48 |
| 3,385,014 | 5/1968 | Haug | 180/9.48 |
| 3,820,616 | 6/1974 | Juergens | 180/9.48 |

Primary Examiner—Philip Goodman
Assistant Examiner—John A. Carroll
Attorney, Agent, or Firm—Phillips, Moore, Weissenberger Lempio & Strabala

[57] ABSTRACT

A track-type vehicle comprises a pair of laterally spaced track roller frames mounted on a main frame by adjustment means to vary the gauge width between the track roller frames. Such adjustment means comprises first and second alignment means disposed in parallel relationship and perpendicular to the track roller frames.

9 Claims, 3 Drawing Figures

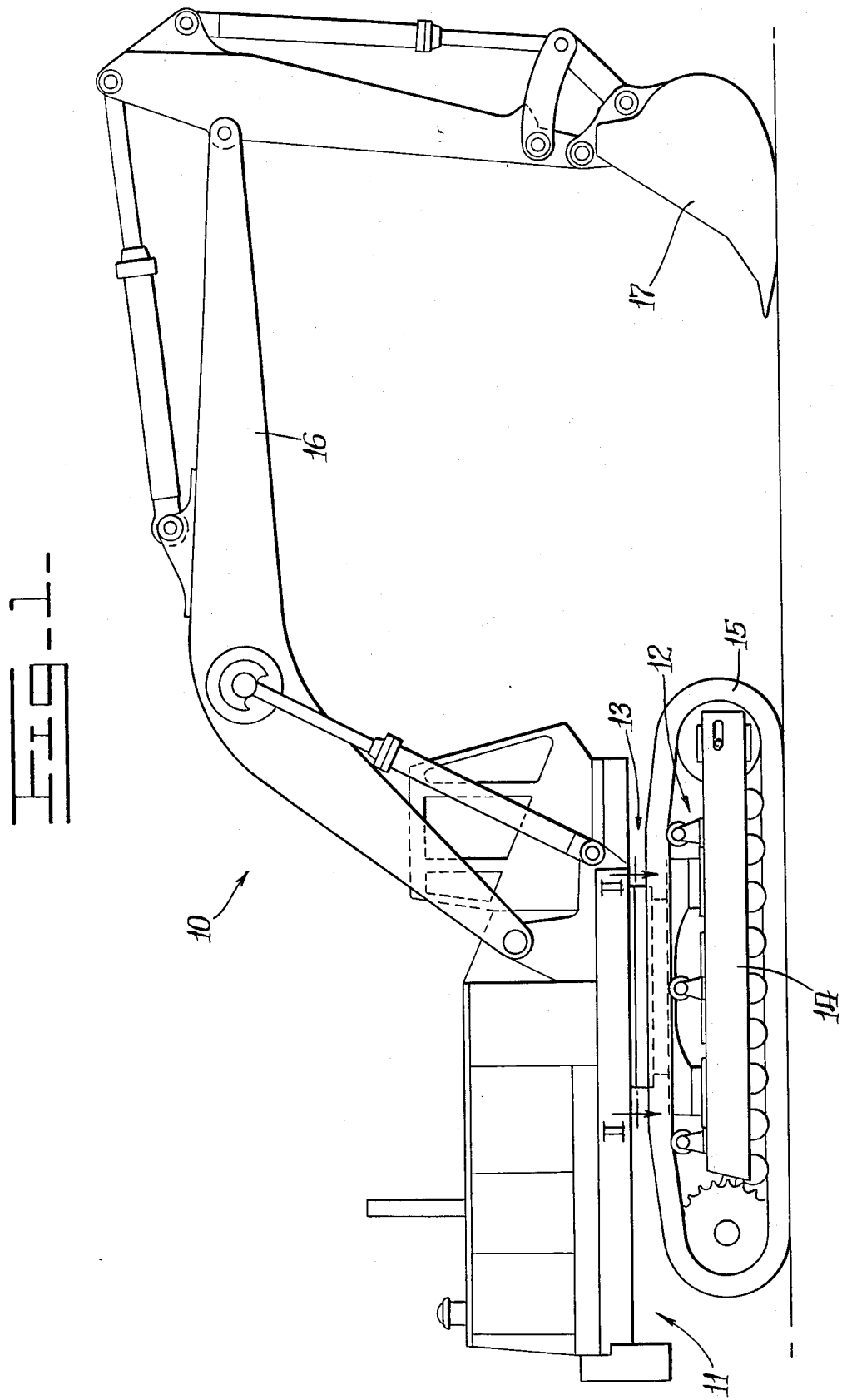

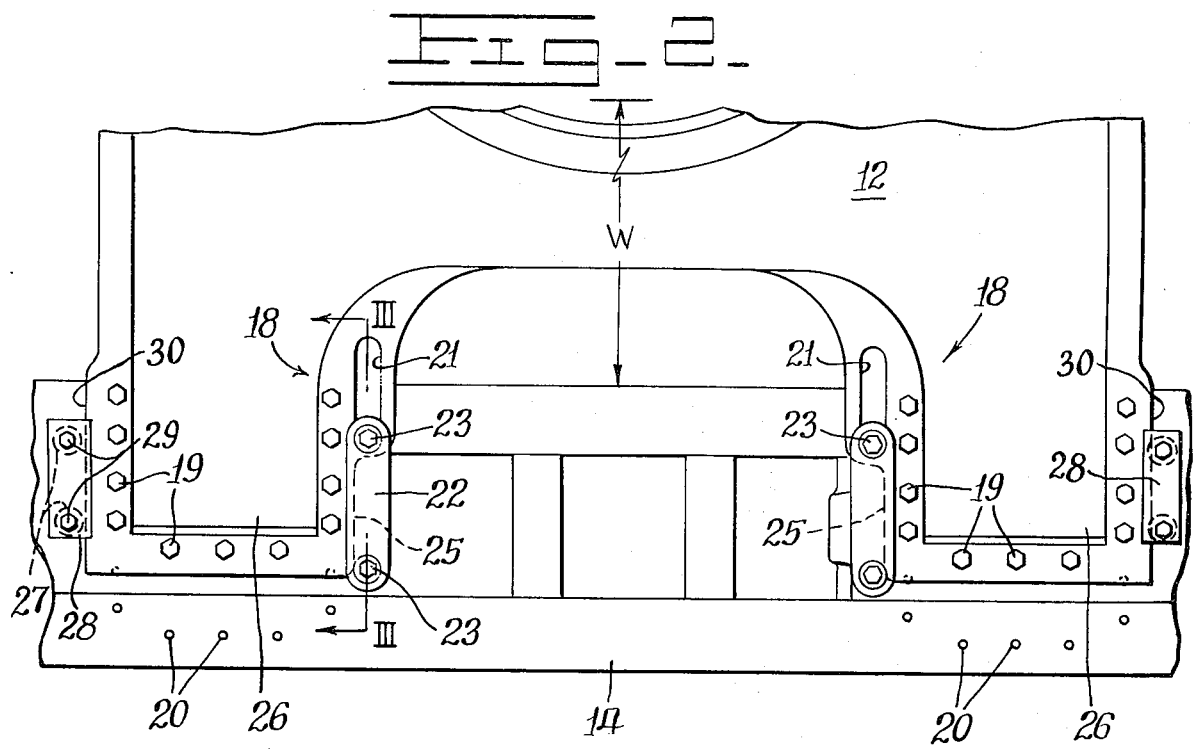
Fig_2_
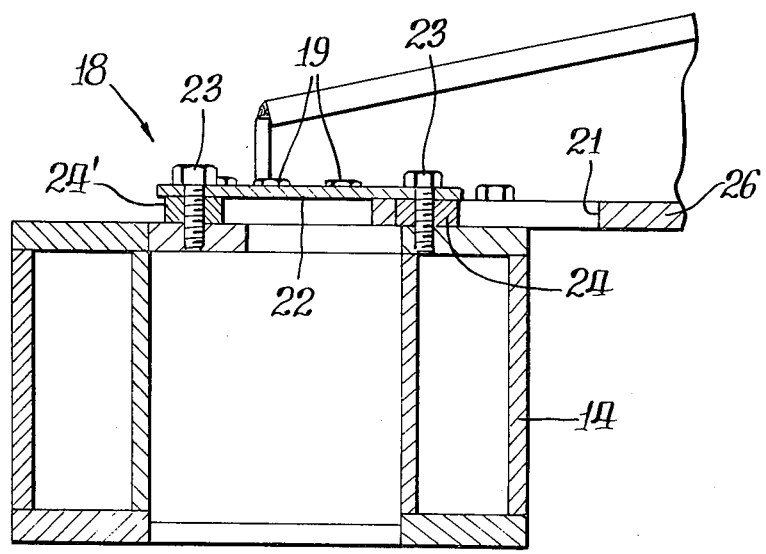
Fig_3_

GAUGE WIDTH ADJUSTMENT MEANS FOR TRACK-TYPE VEHICLES

BACKGROUND OF THE INVENTION

Track-type vehicles, such as hydraulic excavators, normally comprise a substantial gauge width between the track roller frames to increase the overall stability of the vehicles during earthworking operations. When such a vehicle is transported to a job site or the like, the gauge width may exceed the legal minimum, as dictated by various governmental regulations. Therefore, in conventional practice the track roller frames and/or the entire undercarriage of the vehicle must be disassembled for transportation purposes. Such procedures are time consuming and expensive to carry forth.

SUMMARY OF THE INVENTION

An object of this invention is to overcome the above, briefly described problems by providing an economical and non-complex adjustment means for selectively narrowing the gauge width between the track roller frames of a track-type vehicle. In the preferred embodiment of this invention, such adjustment means comprises first and second alignment means disposed in parallel relationship and adapted to remain in place as a permanent part of the vehicle.

BRIEF DESCRIPTION OF THE DRAWINGS

Other objects of this invention will become apparent from the following description and accompanying drawings wherein:

FIG. 1 is a side elevational view of a hydraulic excavator employing four gauge width adjustment means of this invention therein;

FIG. 2 is an enlarged top plan view of the adjustment means, taken in the direction of arrows II—II in FIG. 1; and FIG. 3 is an enlarged sectional view of a portion of the adjustment means, taken in the direction of arrows III—III in FIG. 2.

DETAILED DESCRIPTION

FIG. 1 illustrates a hydraulic excavator 10 comprising an upper frame 11 rotatably mounted on a lower frame 12 by a swing gear mechanism, generally shown at 13. The frame is fixedly secured to a pair of laterally spaced and parallel track roller frames 14 (one shown), each having an endless track 15 mounted thereon in a conventional manner. The excavator has a boom 16 pivotally mounted on a forward end thereof to carry a work implement thereon, such as a bucket 17.

FIGS. 2 and 3 disclose a pair of substantially identical adjustment means 18, preferably associated with each track roller frame, for selectively varying the gauge width W between the laterally spaced track roller frames. Frame 14 is shown at its maximum gauge width or "out" position with a plurality of releasable fastening means or cap screws 19 securing frame 12 to underlying frame 14. Upon inward movement of track roller frame 14 to its minimum gauge width or "in" position, released cap screws 19 are adapted to re-engage threaded apertures 20, formed in the track roller frame.

Each adjustment means 18 comprises an elongated slot 21 disposed transversely relative to a longitudinal axis of the track roller frame, a flat plate 22 having a substantially constant thickness throughout its length which at least partially overlies the slot and a pair of cap screws 23 extending through opposite ends of the plate and threadably attached to underlying frame 14. As shown in FIG. 3, annular guide members and spacers 24 and 24' are preferably mounted on the shanks of the cap screws and are disposed between the plate and frame 14. Inboard spacer 24 is disposed in slot 21 to provide first alignment means for precisely moving the track roller frame perpendicular to the longitudinal axis thereof and inwardly relative to main frame 12.

In certain applications, outboard spacer 24' may provide second alignment means, along with a respective one of parallel guide surfaces 25 formed on laterally extending mounting plates 26 of frame 12, disposed in tandem relationship with respect to the first alignment means. However, in the preferred embodiment of this invention, such second alignment means comprises a pair of similar spacers 27, each secured between a plate 28 and the track roller frame by a cap screw 29. The spacers abut guide surfaces 30 to cooperate with the first alignment means to guide the track roller frame during adjustment thereof.

The vertical heights of spacers 24, 24' and 27 are machined so that when cap screws 23 and 29 are tightened, mounting plate 26 is not tightly clamped between plates 22 and 28 and frame 14. Therefore, the cap screws do not require loosening when track roller frames 14 are moved between their in and out positions.

We claim:

1. In a track-type vehicle comprising a main frame, a pair of laterally spaced track roller frames mounted beneath said main frame and releasable fastening means normally securing said track roller frames to said main frame at a maximum gauge width between said track roller frames, the invention comprising adjustment means, including first and second alignment means disposed in parallel relationship and transversely relative to a longitudinal axis of each of said track roller frames, operatively connected between overlying portions of said main frame and at least one of said track roller frames for permitting selective narrowing of the gauge width between said track roller frames upon release of said fastening means.

2. The invention of claim 1 wherein said first alignment means comprises an elongated slot formed through said main frame, a plate at least partially overlying said slot and a first guide member disposed in said slot and attached between said plate and said one track roller frame.

3. The invention of claim 2 wherein said plate is flat and has a substantially constant thickness throughout the length thereof.

4. The invention of claim 2 wherein said second alignment means comprises at least one second guide member attached to said one track roller frame and a guide surface formed on said main frame and engaged by said second guide member.

5. The invention of claim 1 wherein said vehicle constitutes a hydraulic excavator and said main frame comprises a pair of longitudinally spaced mounting plates extending laterally outwardly in overlying relationship relative to a respective track roller frame, one of said adjustment means operatively connecting each of said plates to such respective track roller frame.

6. A track-type vehicle comprising a main frame, a pair of laterally spaced track roller frames mounted beneath said main frame and adjustment means operatively connected between said main frame and at least one of said track roller frames for selectively changing the gauge width between said track roller frames, said adjustment means comprising an elongated slot formed through said main frame, a plate at least partially overlying said slot, a first guide member disposed in said slot and attached between a first end of said plate and said one track roller frame and at least one second guide member attached to said one track roller frame in longitudinally spaced relationship along said track roller frame relative to said first guide member.

7. The vehicle of claim 6 wherein said adjustment means further comprises a guide surface formed on said main frame and engaged by a pair of said second guide members.

8. The vehicle of claim 6 wherein each of said track roller frames is operatively connected to said main frame by at least one of said adjustment means.

9. The vehicle of claim 8 wherein each of said track roller frames is operatively connected to said main frame by a pair of said adjustment means.

* * * * *